United States Patent [19]
Baker

[11] Patent Number: 5,389,951
[45] Date of Patent: Feb. 14, 1995

[54] LIQUID CRYSTAL DISPLAY INTEGRATED WITH HALL EFFECT POINTING DEVICE

[75] Inventor: Robert G. Baker, Delray Beach, Fla.

[73] Assignee: International Business Machines Corp., Armonk, N.Y.

[21] Appl. No.: 95,626

[22] Filed: Jul. 21, 1993

[51] Int. Cl.$^6$ .............................................. G09G 3/02
[52] U.S. Cl. ...................................... 345/174; 345/92; 178/18
[58] Field of Search ............... 345/104, 173, 174, 175, 345/177, 179, 180, 182, 92; 178/18, 19

[56]       References Cited
       U.S. PATENT DOCUMENTS

| | | | |
|---|---|---|---|
| 3,944,740 | 3/1976 | Murase et al. | 345/174 |
| 4,841,290 | 6/1989 | Nakano et al. | 345/179 |
| 5,151,688 | 9/1992 | Tanaka et al. | 345/104 |

*Primary Examiner*—Alvin E. Oberley
*Assistant Examiner*—Gin Goon

*Attorney, Agent, or Firm*—Daniel E. McConnell; Douglas R. McKechnie

[57]                ABSTRACT

A liquid crystal display (LCD) is constructed in layers including an integrated circuit layer containing thin film transistors (TFTs) for controlling activation of individual liquid crystal cells, and selectively actuatable Hall effect elements (HEEs) for controlling operation of the TFTs. The display operates in different modes including operating solely as an output device, or as an input device, or both. Each HEE and TFT is contained in a cell circuit that further includes a switch operable in a plurality of modes in accordance with the settings of mode control signals and cell selection signals. A magnetic actuator produces a magnetic field for selectively actuating cells. Cell circuits produce output signals dependent on the polarity of the actuating magnetic field. An alternate cell circuit allows a cell to be actuated by a field of one polarity and deactuated by a second field of the opposite polarity.

13 Claims, 3 Drawing Sheets

FIG. 1
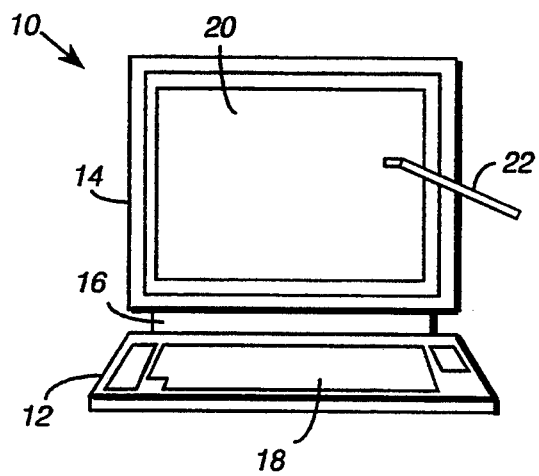
FIG. 2
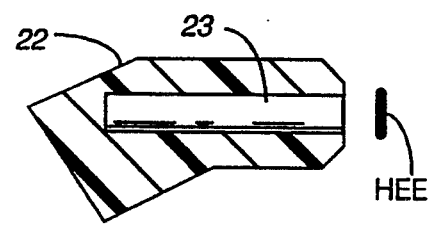
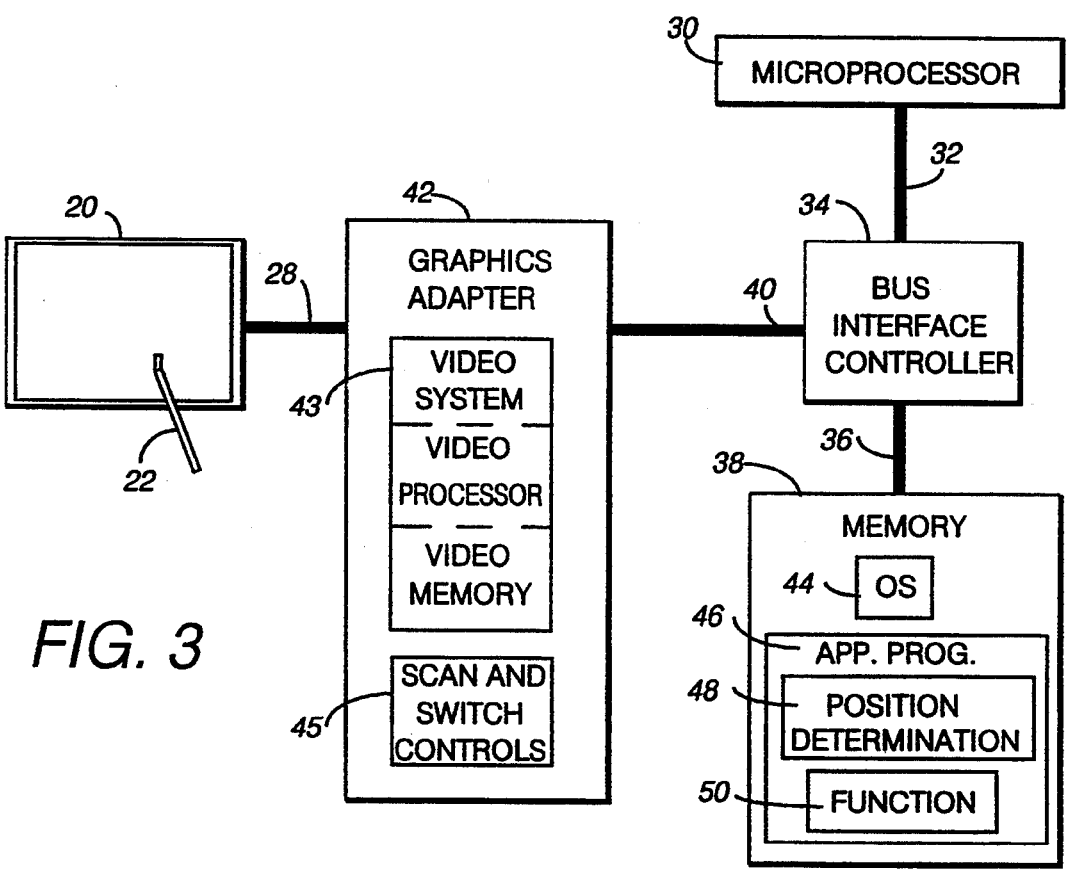
FIG. 3

5,389,951

LIQUID CRYSTAL DISPLAY INTEGRATED WITH HALL EFFECT POINTING DEVICE

RELATED APPLICATION

Application Ser. No. 08/095,629, filed on even date herewith, by Robert G. Baker, for "DIGITIZING APPARATUS HAVING ARRAY OF HALL EFFECT SENSORS" and assigned to the assignee of this application.

BACKGROUND OF THE INVENTION

1. Field of the Invention

This invention relates to improvements in display apparatus for displaying and entering information from and into data processing apparatus such as personal computers. More particularly, the invention relates to an improved pointing device having an array or grid of Hall effect sensors that are actuated by a magnetic actuator and are integrated with a thin film transistor (TFT) liquid crystal display (LCD).

2. Description of Related Art

Touch displays, for data processing systems, combine the output functions of a display with input functions allowing a user to input information into the system. In portable computers, where size and weight are critical, LCDs are the current display of choice among portable computer manufacturers. LCDs are commonly formed with an active matrix of picture elements (PELs) each containing a TFT coupled with liquid crystal material that transmits light in accordance with control signals applied to the TFT. The transmissivity or apparent brightness of the PEL is a function of the polarization of the liquid crystal material which is a function of the magnitude of a drain voltage applied to the TFT and of the time during which such voltage is applied in conjunction with a gate signal.

Adding touch capability to a display usually increases its size and weight. The technologies that exist for incorporating touchscreen capability include resistive, capacitive, surface acoustic wave (SAW), light emitting diode beam, and scanning lasers. These technologies are all packaged separately from the display itself or added as separate layers in the manufacturing process.

Cursor positioning devices, such as keyboard keys, trackballs, joysticks, and mice, have abstractions of use that are not well suited to a natural human interface, and normally require tethers, cables, or boxes. Unless the devices are connected by an infrared or radio frequency link, the cables restrict and interfere with user freedom of movement.

Overlaid pointing devices are affected by problems. A user's finger size can generate false points or cause difficulty in achieving tight control on a point when using resistive, capacitive, or SAW touchscreens. These types of touchscreens are also susceptible to buildup of dirt or grease.

A further problem of parallax is caused by the thicknesses of overlays on the front of displays, in relation to the source of light control, i.e., the LCD matrix itself. Depending on view angle, parallax distortion can cause difficulty in placing the pointing subsystem to the desired locations.

As should be readily apparent from the description below, the invention includes a unique array of Hall effect elements directly integrated into the LCD semiconductor control structure. A Hall effect element is a well known device whose operating characteristics have been described in numerous articles including: Trent Wood, "An introduction to the use of Hall effect devices", Measurement-Control Volume 21, May 1988, pages 109–111; Douglas White, "The Hall effect sensor: operation and application", Australian Electronics Engineering, April 1989, pages 84–88; R. S. Popovic, "Hall-effect devices", Sensors and Actuators, 17(1989), pages 39–53; and S. Kordic, "Integrated Silicon Magnetic field sensors", Sensors and Actuators, 10(1986), pages 347–378. The latter two articles describe how Hall effect devices can be made by integrated circuit techniques. While these articles describe many diverse applications, most if not all involve the use of a single Hall effect device primarily designed to sense the proximity of a magnet having the proper orientation and polarity. None disclose the use of an array of Hall effect devices integrated into an LCD in the manner of the invention.

SUMMARY OF THE INVENTION

One of the objects of the invention is to provide an improved LCD touchscreen in which an array of Hall effect sensors is built into a TFT matrix of the LCD.

Another object of the invention is to provide a touchscreen LCD in which a plurality of Hall effect sensors are built into the matrix of TFTs of the display, the sensors being mapped one-on-one with the TFTs to thereby eliminate mapping of sensors to LCD cells and simplify implementation.

Briefly, in accordance with the invention, an LCD is constructed in layers including an integrated circuit layer containing TFTs for controlling activation of individual liquid crystal cells, and selectively actuatable Hall effect elements for controlling operation of the TFTs.

BRIEF DESCRIPTION OF THE DRAWINGS

Other objects and advantages of the invention will be apparent from the following description taken in connection with the accompanying drawings wherein:

FIG. 1 is a pictorial representation of a portable computer embodying the invention;

FIG. 2 is an enlarged cross section of the tip of the magnetic actuator shown in FIG. 1;

FIG. 3 is a block diagram illustrating principal functional elements of the computer shown in FIG. 1;

DESCRIPTION OF ILLUSTRATIVE EMBODIMENT

Figure 4:
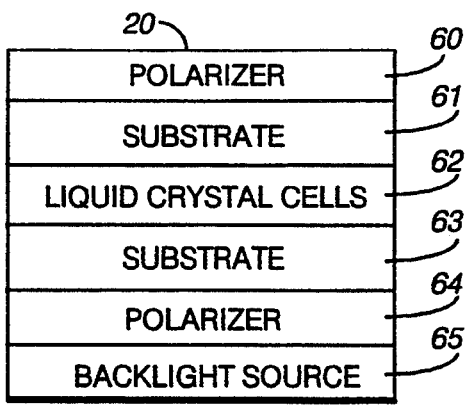
FIG. 4 is a schematic diagram showing the layered structure of an LCD constructed in accordance with the invention.

Referring now to the drawings, and first to FIG. 1, the invention is described as embodied in a portable computer 10. However, it should be apparent to those skilled in the art that the invention could readily be embodied in tablet computers, notebook computers, and the like. Portable computer 10 is shown in an open position and comprises a base 12 having a lid 14 mounted on the base by a hinge support 16. Base 12 includes a keyboard 18 that is normally oriented in a horizontal position for actuation by a user. Lid 14 comprises a touchscreen display 20 constructed in accordance with the invention in the manner described in detail hereinafter. A magnetic stylus 22 is manipulable by a user relative to display 20, for entering information into the computer. When lid 14 is open, display 20 is upright for normal viewing by the user and for ready access to manipulate stylus 22 and actuate the touchscreen display.

Referring to FIG. 2, stylus 22 is elongated and has a tip that is angularly offset from the remainder of the stylus, the tip having embedded therein a bar magnet 23. Other than the magnet, the remainder of stylus is transparent to magnetic flux. The angle of the offset facilitates the user manipulating the magnet so as to position the bar magnet perpendicular to the plane of the Hall effect elements (HEE) embedded in display 20. Magnet 23 has a north pole at one end and a south pole at the other end and emits conventional magnetic flux lines that extend outwardly from one end and then curve back and into the other end. When magnetic flux is perpendicular to a current conducting HEE, a voltage is produced across the HEE by the well known Hall effect, the voltage being proportional to the perpendicular component of the flux density. Magnet 23 thus functions as an actuator allowing the HEEs to detect and indicate the position of the actuator in accordance with which ones of the HEEs produce the Hall effect. The size of the magnet and its flux field can vary from a very narrow field, which can actuate only one HEE at a time, to a wider field in which plural HEEs are simultaneously actuated. In the latter case, position determination software 48 determines the position, for example, by choosing the HEE at the centroid of the HEEs that are actuated.

Referring to FIG. 3, computer 10 preferably comprises a commercially available PS/2 personal computer having a microprocessor 30 connected by a local bus 32 to a bus interface controller 34. Controller 34 is connected by memory bus 36 to a memory which stores programs being executed by microprocessor 30. Controller 34 is also connected to an expansion or I/O bus 40 and functions as both a memory controller and a bus controller. A graphics adapter 42 is connected to bus 40 and to a cable 28 that is connected to touchscreen display 20. The programs include an operating system (OS) 44, and a graphics application program 46 that executes under control of the operating system. Program 46 includes a routine 48 for determining the position of actuator 22 and a routine 50 that interprets the position and performs some function dependent upon such position. Graphics adapter 42 comprises a conventional video system 43, including a video processor and a video memory, for operating the LCD in a conventional mode to display output information on the screen, and scan and switch controls 45 for scanning the cells of the LCD and controlling the mode of operation, as described in greater detail below.

Referring to FIG. 4, display 20 comprises a plurality of layers comprising a polarizer 60, a substrate 61, liquid crystal cells 62, substrate 63, polarizer 64, and backlight source 65. Polarizer plates 60 and 64 improve the contrast characteristics of the LCD. Substrate 61 supports and has on its lower face a reference electrode layer for completing a circuit and causing state changes in the liquid crystal material. Substrate 63 is beneath the layer 62 of liquid crystal cells and comprises the matrix array of Hall sensor cells, switching elements, thin film transistors, and interconnecting lines, the operation of which is described hereinafter. Backlight source 65 provides light for using the display in low-light or dark environments, and can be activated separately under associated conventional computer or manual control.

Figure 5:
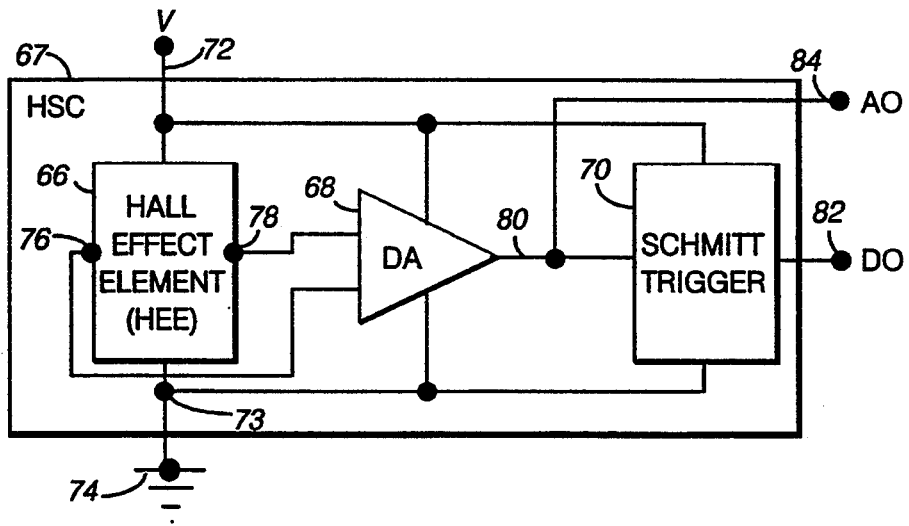
FIG. 5 is a block diagram of a Hall sensor cell.

Substrate 63 contains an array or grid of Hall sensor cells (HSC). With reference to FIG. 5, each HSC comprises a HEE 66, a differential amplifier (DA) 68, and a Schmitt trigger 70. HEE 66 is made of semiconductor material, such as silicon, and has a flat rectangular shape. A HEE is actuated in conventional fashion by applying power to the ends of the element so that current flows longitudinally through the element. When the current is thus flowing, a voltage differential is created across the element at lateral outputs 76 and 78, when magnetic flux passes perpendicularly through the plane of the HEE. The magnitude of the voltage created is proportional to the perpendicular component of the flux density. One end of the HEE is connected by line 72 to a regulated voltage source V and the other end is connected by line 73 to ground 74. When the voltage source is turned on, current flows longitudinally through HEE 66.

Voltage source V and ground 74 are further connected in parallel over lines 72 and 73 to DA 68, and Schmitt trigger 70. Outputs 76 and 78 are connected as inputs into DA 68. DA 68 produces an output voltage signal on line 80 that is proportional to the voltage output from HEE 66 and is thus proportional to the flux density passing perpendicularly through HEE 66. Trigger 70, which is normally "off", triggers or switches "on" when the output of DA 68 on line 80 reaches a predetermined threshold value. Trigger 70 has an output connected to an output 82 of the HSC and provides a digital output signal DO indicating whether or not the cell is activated when stylus 22 is positioned adjacent the cell. The output signal will remain active until the Hall effect voltage drops below a predetermined value which is generally lower than the value at which the trigger switches on, due to hysteresis. Line 80 from DA 68 is also connected to provide an analog voltage output signal AO at cell output 84. Such analog output signal is proportional to flux density being received by the HEE of the cell, and may be useful for some applications such as a magnetic field measuring device for measuring the strength and pattern of the magnetic field of an actuator.

By virtue of the operation of trigger 70, the DO signal therefrom is dependent on the polarity of the flux lines that actuate HEE 66. The polarity of the bar magnet in actuator 22 is chosen so that, for example, the threshold value on line 80 must be rising or positive going in order to switch the trigger. A negative going signal produced by the opposite polarity does not switch the trigger on. Consequently, the polarity of the bar magnet that is used to actuate a HSC must be of the proper polarity for which the cell is designed. A given cell is designed to be actuated either by a North pole or by a South pole. Advantage is taken of this fact to provide a liquid crystal cell having two HSCs of opposite polarity design, so that the liquid crystal cell can be turned on by a field of a first polarity and turned off by a field of the opposite polarity, as described relative to the alternate embodiment discussed below relative to FIG. 9.

Figure 6:
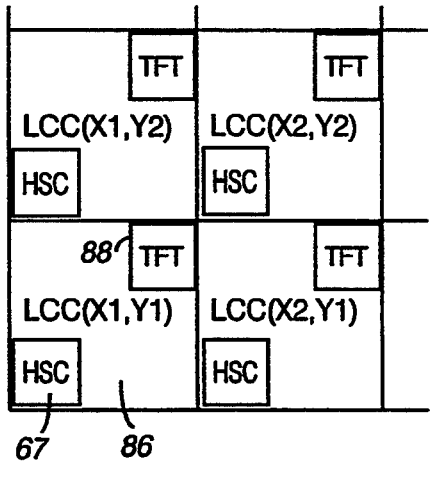
FIG. 6 is a schematic diagram of a portion of the matrix in the LCD.

In layer 62, the liquid crystal cells (LCCs) are arranged in conventional fashion in a rectangular array or grid of adjacent cells with individual cells being identified by their respective orthogonal locations within the grid. Thus, relative to FIG. 6, assuming the grid origin is at the lower left corner of the display, the cell adjacent the origin is LCC(X1,Y1), the cell immediately to the right (in the same row but next column) is LCC(X2,Y1), the cell immediately above the origin cell (in the same column but next row) is LCC(X1,Y2), etc. Beneath each cell is a HSC 67 and a TFT 88. Each cell contains liquid crystal material 86 which darkens in the normal manner when the TFT beneath such material is turned on or activated.

Figure 7:
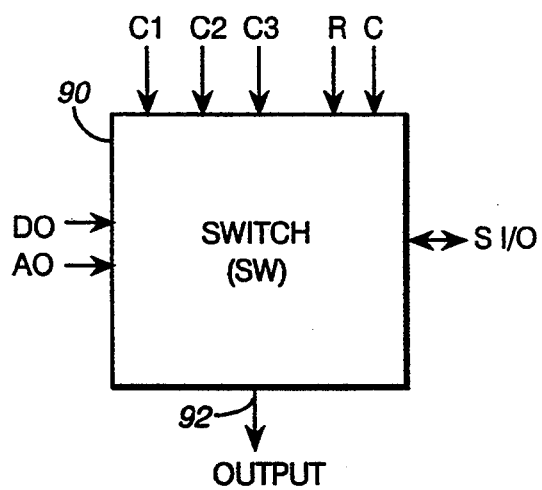
FIG. 7 is a schematic diagram of a cell switch.
Figure 8:
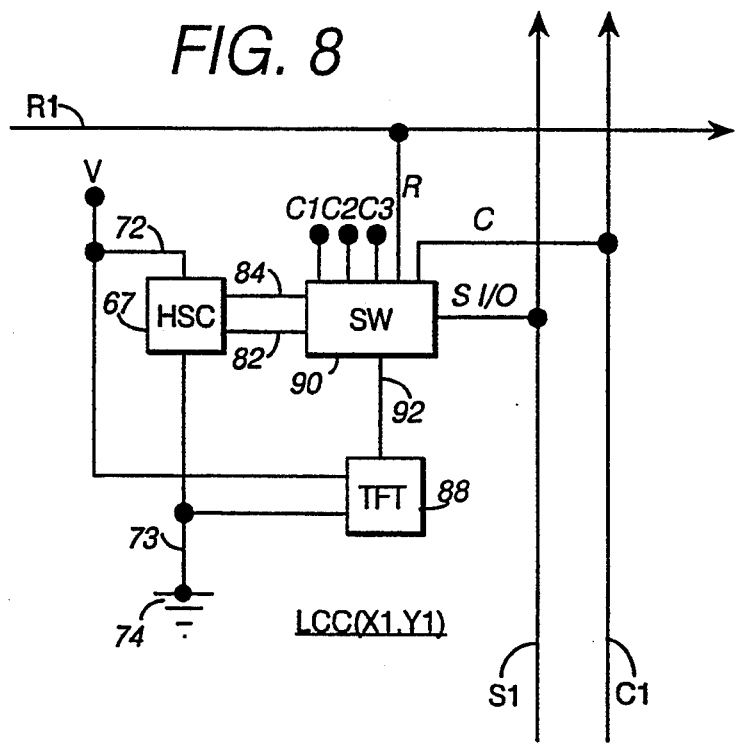
FIG. 8 is a schematic circuit diagram of cell circuitry.

Before considering further details of operation, it might be best to understand the operation of a switch 90 that is used in each of the cells. With reference to FIGS. 7 and 8, switch 90 comprises a plurality of inputs and outputs that are identified in FIG. 7 by the different signals carried thereby. Switch 90 is constructed from miscellaneous small-scale integrated circuits, or could be an ASIC (application specific integrated circuit) with assorted functions, that operates in accordance with the TRUTH TABLE below. The switch signals include analog and digital output signals AO and DO, mode control signals C1, C2, and C3, row and column signals R and C, a bi-directional sense input/output signal S I/O, and an output-to-TFT signal. The TRUTH TABLE is:

| MODE | C1 | C2 | C3 | DO | AO | R | C | SI/O | TFT |
|------|----|----|----|----|----|----|----|------|-----|
| A | X | X | X | X | X | X | 0 | F | 0 |
| B | X | X | X | X | X | 0 | X | F | 0 |
| 1 | 0 | 0 | 1 | X | X | 1 | 1 | Q OUT | Q |
| 2 | 0 | 1 | 0 | Q | X | 1 | 1 | Q IN | 0 |
| 3 | 0 | 1 | 1 | Q | X | 1 | 1 | Q IN | Q |
| 4 | 1 | 0 | 0 | Q | X | 1 | 1 | F | Q |
| 5 | 1 | 0 | 1 | X | ~ | 1 | 1 | ~IN | 0 |
| 6 | 1 | 1 | 0 | X | ~ | 1 | 1 | F | ~ |
| 7 | 1 | 1 | 1 | X | ~ | 1 | 1 | ~IN | ~ |

LEGEND:
0 = logic level off
1 = logic level on
X = don't care
~ = analog signal
Q = current state
F = floating (tristated)

The direction of S I/O is with respect to the video system and microprocessor (or CPU).

Prior to discussing the above modes of operation, the connections within a cell of switch 90 and related components are described with reference to FIG. 8 and to cell LCC(X1,Y1). Switch 90 is connected by lines 84 and 82 to receive analog and digital signals AO and DO from HSC 67. Switch 90 is connected to row line R1 and column line C1 to receive row and column signals R and C. Switch 90 is connected to sense line S1 to receive and transmit sense signals S I/O. Switch 90 is connected by line 92 to transmit its output signal to the gate of TFT 88. The source and drain of TFT 88 are connected to voltage source V and ground 74 by lines 72 and 73. Each row line, e.g. R1, is connected to apply R signals to all cells within the particular row. Each column line, e.g., C1, is connected to apply C signals to all cells with the column. Each sense line, e.g. S1, is connected to all cells with the column. Voltage source V and ground 74 are connected to all cells within the array. Control lines C1, C2, and C3 are connected to all cells within the array. The setting of the control lines is done under the control of microprocessor 30 by providing a standard addressable I/O port through which the control line data is transmitted. The row, column, sense, and control lines are driven by scan and switch controls 45 (FIG. 3) to operate the LCD in different modes according to the TRUTH TABLE above.

Two modes A and B exist, which cause no signal propagation through a cell. These two modes exist when either or both row R or column C is/are deactivated and the cell is not selected. These modes prevent multiple signals from being placed on a single sense line at one time. In all other cases when the row and column lines are both activated, the switch will propagate signals. In mode 1, the state of the cell HEE is ignored while an on or off signal is sent out from the video system. Whichever logic state is sent out (Q), the output to the TFT matches it so that the cell is turned on and off under the control of the video system. This allows the display to be operated as a normal output display device. Hence, mode 1 can be considered a "display-only" mode.

Mode 2 is a sense mode in which the Hall digital signal DO is gated by switch 90 onto the sense line and fed back to the CPU as an input thereby allowing the application software to determine the position of an activated cell. The digital value is not sent to the TFT, so no visual indication is made. Mode 3 matches mode 2 with the difference that the digital signal DO is also sent to the TFT allowing the user to observe the state of the cell.

In mode 4, no signal is sent to the CPU over the sense line. The state of the HSC digital output is only sent to the TFT for display purposes.

In modes 5-7, the HSC analog output AO is used instead of the digital output DO, with the sense and output to TFT being handled in a manner similar to that for the digital signal.

It should be noted that the switches can be readily controlled to switch between modes under the control of the microprocessor and application. The sense lines Sx are time multiplexed by switching back and forth between two different modes, such as modes 1 and 2 or 3. When switched between modes 1 and 3 or 4, each switch acts as a multiplexer to propagate either the signal from the HSC or the signal from the sense line, dependent upon the settings of the control lines. By switching back and forth between modes 1 and 3 or 4, the video display operates, relative to the user, as a combined input and output device in which, e.g., the application can create or output selection buttons on the screen and the user can then input a selection by actuating a cell within a button.

Figure 9:
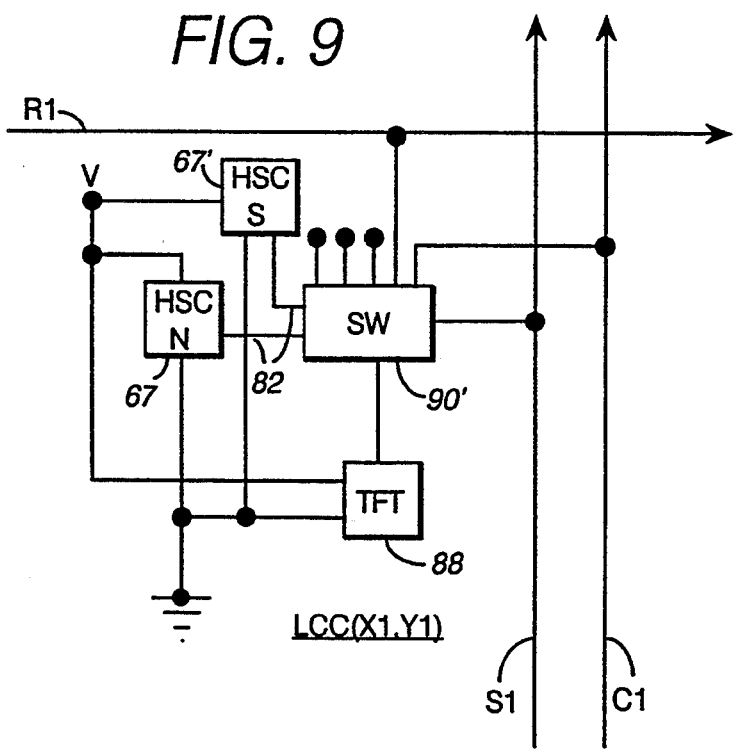
FIG. 9 is a schematic circuit diagram, similar to FIG. 8, of an alternate embodiment of the invention.

Referring to FIG. 9, in an alternate embodiment of the invention, each cell includes an HSC 67' that can be actuated by a magnetic pole having a polarity opposite to that which actuates HSC 67. Thus, assuming HSC 67 is actuated by a North pole, HSC 67' is actuated by a South pole. In the cell of FIG. 9, the analog outputs of the HSCs are not used and the digital outputs 82 of both HSCs are connected as inputs to switch 90'. Such switch differs from that shown in FIG. 8 because of the addition of a second DO input and the elimination of the AO input into the switch. Such differences thus allow the control signals C1-C3 to be set so as to provide a mode in which a North pole actuator can be used to actuate HSC 67 and thereby turn the LCC on, and a South pole actuator can be used to thereafter actuate HSC 67' and turn the same LCC off. This on-off mode can be controlled by setting control signals C1–C3 to a mode, e.g. mode 5 used in the embodiment of FIG. 8 for analog signals. Modes A, B, and 1–4 are used in both embodiments.

It should be apparent to those skilled in the art that many changes can be made in the details and arrangements of steps and parts without departing from the scope of the invention as defined in the appended claims.

What is claimed is:

1. Liquid crystal display apparatus comprising:
   a liquid crystal display (LCD) comprising a layer of liquid crystal cells (LCCs) each containing liquid crystal material, said LCCs being arranged in a rectangular array; a magnetic actuator that is selectively movable adjacent to said LCD and said LCCs for selectively actuating said LCCs; and
   a substrate positioned adjacent said layer, said substrate having a plurality of cell circuits, each cell circuit being positioned adjacent a different LCC and comprising
      a thin film transistor (TFT) for actuating liquid crystal material adjacent thereto in response to a control signal applied to such TFT,
      a Hall sensor cell (HSC) comprising a Hall effect element (HEE) and signal conditioning circuitry coupled to said HEE for generating a first control signal in response to actuation of said HEE by said actuator, and
      a switch having a first control signal input coupled to said signal conditioning circuitry for receiving said first control signal therefrom, said switch further having an output coupled to said TFT for transmitting a control signal thereto, said switch having a plurality of modes of operation including a first mode in which control signals generated by said signal conditioning circuitry are propagated through said switch and applied to said TFT to thereby actuate said liquid crystal material when said actuator is adjacent said HEE.

2. Liquid crystal display apparatus in accordance with claim 1 further comprising:
   video processing means coupled to said cell circuits for generating and transmitting second control signals; and
   in each cell circuit, said switch has a second control signal input for receiving second control signals from said video processing means, said switch having a second mode of operation in which said second control signals from said video processing means are applied to said TFT for actuating liquid crystal material adjacent to said TFT.

3. Liquid crystal display apparatus in accordance with claim 2 comprising:
   a computer coupled to said video processing means; and
   said switch in each cell circuit has a third mode of operation in which said first control signal from said HSC is inputted into said computer.

4. Liquid crystal display apparatus in accordance with claim 3 comprising:
   mode control means for generating mode control signals for controlling operation of said switches; and
   each switch comprises mode input means for receiving said mode control signals for selectively setting said switch to operate in accordance with said mode control signals.

5. Liquid crystal display apparatus in accordance with claim 4 comprising:
   I/O line means connected to said video processing means for selectively transmitting said second control signals to said TFTs when said switches are set to operate in said second mode and transmitting said first control signals to said computer when said switches are set to operate in said third mode.

6. Liquid crystal display apparatus in accordance with claim 5 wherein said mode control means operates to switch back and forth between said second and third modes to thereby time multiplex transmitting said second and first control signals on said I/O line means thereby concurrently operating said LCD as both an output device in which information from said computer is displayed and an input device in which information can be entered into said computer by manipulation of said actuator.

7. Liquid crystal display apparatus in accordance with claim 5 comprising:
   cell selection means coupled to said switches for selectively enabling said switches one-at-a-time to input said first control signals into said computer when said switches are set to said third mode and to selectively actuate said LCCs one-at-a-time when said switches are set to said second mode.

8. Liquid crystal display apparatus in accordance with claim 7 wherein:
   said LCCs and said cell circuits are arranged in columns and rows; and
   said cell selection means comprises a plurality of row lines, each row line being connected to a plurality of switches in a row, and each column line being connected to a plurality of switches in a column, whereby a given switch is enabled by coincident active signals on said row line and said column line connected thereto.

9. Liquid crystal display apparatus in accordance with claim 8 wherein said I/O line means comprises a plurality of sense lines each connected to a plurality of switches in a different column.

10. Liquid crystal display apparatus in accordance with claim 9 wherein each cell circuit further comprises:
    a differential amplifier coupled to said HEE in such cell for receiving said Hall effect voltage therefrom, said differential amplifier producing an output signal proportional to said Hall effect voltage produced by said HEE connected thereto, and
    a trigger connected to said differential amplifier for producing a digital output signal indicating when said voltage from said differential amplifier is above a predetermined magnitude.

11. Liquid crystal display apparatus in accordance with claim 10 wherein each cell circuit further comprises:
    a second HEE;
    a second differential amplifier coupled to said second HEE in such cell for receiving said Hall effect voltage therefrom, said second differential amplifier producing a second output voltage signal proportional to said Hall effect voltage produced by said second HEE connected thereto, and
    a second trigger connected to said second differential amplifier for producing a second digital output signal indicating when said second output voltage signal from said second differential amplifier is greater than a second predetermined value when said second HEE is actuated by a magnetic field having a polarity opposite to that which actuates said first mentioned HEE in such cell.

12. Liquid crystal display apparatus comprising:

a liquid crystal display (LCD) comprising a layer of liquid crystal cells (LCCs) each containing liquid crystal material, said LCCs being arranged in a rectangular array;

a magnetic actuator that is selectively movable adjacent to said LCD and said LCCs for selectively actuating said LCCs;

a substrate positioned adjacent said layer, said substrate having a plurality of cell circuits, each cell circuit being positioned adjacent a different LCC and comprising a thin film transistor (TFT) for actuating liquid crystal material adjacent thereto in response to a control signal applied to such TFT, a Hall sensor cell (HSC) comprising a Hall effect element (HEE) for generating a Hall effect voltage, a differential amplifier coupled to said HEE for receiving said Hall effect voltage therefrom, said differential amplifier producing an output signal proportional to said Hall effect voltage produced by said HEE connected thereto, and a trigger connected to said differential amplifier for producing a digital output signal indicating when said voltage from said differential amplifier is above a predetermined magnitude and thereby generating a first control signal in response to actuation of said HEE by said actuator, a switch having a first control signal input coupled to said trigger for receiving said first control signal therefrom, said switch further having an output coupled to said TFT for transmitting a control signal thereto, said switch having a plurality of modes of operation including a first mode in which control signals generated by said trigger are propagated through said switch and applied to said TFT to thereby actuate said liquid crystal material when said actuator is adjacent said HEE;

said LCCs and said cell circuits being arranged in columns and rows;

mode control means for generating mode control signals for controlling operation of said switches comprised in said cell circuits;

video processing means coupled to said cell circuits for generating and transmitting second control signals;

a computer coupled to said video processing means;

said switch in each cell circuit having a second control signal input for receiving second control signals from said video processing means and mode input means for receiving said mode control signals for selectively setting said switch to operate in accordance with said mode control signals, said switch having (a) a second mode of operation in which said second control signals from said video processing means are applied to said TFT for actuating liquid crystal material adjacent to said TFT and (b) a third mode of operation in which said first control signal from said HSC is inputted into said computer;

I/O line means connected to said video processing means for selectively transmitting said second control signals to said TFTs when said switches are set to operate in said second mode and transmitting said first control signals to said computer when said switches are set to operate in said third mode, said I/O line means comprising a plurality of sense lines each connected to a plurality of switches in a different column; and cell selection means comprising a plurality of row lines, each row line being connected to a plurality of switches in a row, and each column line being connected to a plurality of switches in a column, whereby a given switch is enabled by coincident active signals on said row line and said column line connected thereto for selectively enabling said switches one-at-a-time to input said first control signals into said computer when said switches are set to said third mode and to selectively actuate said LCCs one-at-a-time when said switches are set to said second mode.

13. Liquid crystal display apparatus comprising:

a liquid crystal display (LCD) comprising a layer of liquid crystal cells (LCCs) each containing liquid crystal material, said LCCs being arranged in a rectangular array;

a magnetic actuator that is selectively movable adjacent to said LCD and said LCCs for selectively actuating said LCCs;

a substrate positioned adjacent said layer, said substrate having a plurality of cell circuits, each cell circuit being positioned adjacent a different LCC and comprising a thin film transistor (TFT) for actuating liquid crystal material adjacent thereto in response to a control signal applied to such TFT, a first Hall sensor cell (HSC) comprising a first Hall effect element (HEE) actuated by a magnetic field having a first polarity for generating a Hall effect voltage, a first differential amplifier coupled to said HEE for receiving said Hall effect voltage therefrom, said first differential amplifier producing an output signal proportional to said Hall effect voltage produced by said first HEE connected thereto, and a first trigger connected to said differential amplifier for producing a digital output signal indicating when said voltage from said first differential amplifier is above a predetermined magnitude and thereby generating a first control signal in response to actuation of said first HEE by said actuator, a second Hall sensor cell (HSC) comprising a second Hall effect element (HEE) actuated by a magnetic field having a polarity opposite said first polarity for generating a Hall effect voltage, a second differential amplifier coupled to said HEE for receiving said Hall effect voltage therefrom, said second differential amplifier producing an output signal proportional to said Hall effect voltage produced by said second HEE connected thereto, and a second trigger connected to said differential amplifier for producing a digital output signal indicating when said voltage from said second differential amplifier is above a predetermined magnitude and thereby generating a second control signal in response to actuation of said HEE by said actuator, a switch having a first control signal input coupled to said first and second triggers for receiving said first and second control signals therefrom, said switch further having an output coupled to said TFT for transmitting a control signal thereto, said switch having a plurality of modes of operation including a first mode in which control signals generated by said triggers are propagated through said switch and applied to said TFT to thereby activate said liquid crystal material when a first polarity of magnetic field is adjacent said HEE and deactivate said liquid crystal material when a second polarity of magnetic field is adjacent said HEE;

said LCCs and said cell circuits being arranged in columns and rows;

mode control means for generating mode control signals for controlling operation of said switches comprised in said cell circuits;

video processing means coupled to said cell circuits for generating and transmitting third control signals;

a computer coupled to said video processing means;

said switch in each cell circuit having a control signal input for receiving third control signals from said video processing means and mode input means for receiving said mode control signals for selectively setting said switch to operate in accordance with said mode control signals, said switch having (a) a second mode of operation in which said third control signals from said video processing means are applied to said TFT for actuating liquid crystal material adjacent to said TFT and (b) a third mode of operation in which said first and second control signals from said HSC is inputted into said computer;

I/O line means connected to said video processing means for selectively transmitting said third control signals to said TFTs when said switches are set to operate in said second mode and transmitting said first and second control signals to said computer when said switches are set to operate in said third mode, said I/O line means comprising a plurality of sense lines each connected to a plurality of switches in a different column; and cell selection means comprising a plurality of row lines, each row line being connected to a plurality of switches in a row, and each column line being connected to a plurality of switches in a column, whereby a given switch is enabled by coincident active signals on said row line and said column line connected thereto for selectively enabling said switches one-at-a-time to input said first and second control signals into said computer when said switches are set to said third mode and to selectively actuate said LCCs one-at-a-time when said switches are set to said second mode.

* * * * *